Dec. 8, 1931.   F. P. RYDER ET AL   1,835,242
METHOD AND APPARATUS FOR SEPARATING STRING BEANS
Filed Sept. 30, 1929    2 Sheets-Sheet 1

Inventors
Frank P. Ryder,
William D. Chisholm
By A. P. Greely
Attorney

UNITED STATES PATENT OFFICE

FRANK PITTIS RYDER AND WILLIAM DONALD CHISHOLM, OF NIAGARA FALLS, NEW YORK

METHOD AND APPARATUS FOR SEPARATING STRING BEANS

Application filed September 30, 1929. Serial No. 396,375.

Our invention relates to means for separating string beans from stalks and other portions of the plants on which they were grown. The canning of string beans has become an extensive industry and hardly less important than the canning of green peas. But while it has been found possible to do away with the hand labor formerly required for picking and shelling green peas by viners which thresh the peas from the vines, the harvesting of string beans presents a much greater difficulty and up to the present time it is the general practice to hand pick the beans from the vines. It is possible to strip the beans from the plants on which they were grown by mechanical means but in so stripping the beans from the plants leaves and stalks are stripped with them and the separation of the beans from these stalks and leaves is difficult. Beans picked by hand also carry with them more or less leaves and pieces of stalk which it is desirable to eliminate. It is the object of our present invention to devise means for effecting this elimination.

While string beans are of considerable length and substantial thickness, some of the stalks stripped from the plants with the beans may be longer than the beans and of as great thickness and may be as heavy with sap as the beans. Leaves, leaf stalks and many of the plant stalks will be of less thickness than the beans, the thickness of beans suitable for canning being about ten sixty-fourths of an inch, and may be more or less dried out.

In carrying out our invention we take advantage of the difference in thickness of the beans and leaves or leaf stems to effect separation of the beans and thicker stalks from leaves and thinner stalks and take advantage of the difference in length between the beans and stalks of greater length than the beans to effect further separation.

Because of the greater thickness of the beans they may be gripped by impelling or accelerating means which will permit leaves, leaf-stems and thinner stalks to pass them without being gripped. By giving the gripping means a high speed of movement the beans and stalks gripped by them will be impelled or thrown a substantial distance depending on their weight, the momentum imparted to a bean heavy with sap being greater than that imparted to a stalk of the same thickness less heavy with sap. It follows that beans and heavier stalks may be thrown further than stalks less heavy with sap and that beans and stalks of sufficient thickness to be acted on by the impelling means may be thrown much further than the leaves and thinner stalks.

In the separation of the beans from the longer stalks we take advantage of the fact that a long stalk given a forward movement will continue in the line of movement until its rear end leaves the gripping means and so its forward end will reach and be caught by a second gripping means while a bean not of sufficient length to reach such second gripping means will drop as soon as its rear end leaves the first feeding means.

With the objects above described and other objects hereinafter explained in view our invention consists in the method and apparatus hereinafter described and claimed.

Referring to the drawings.

Figure 1:
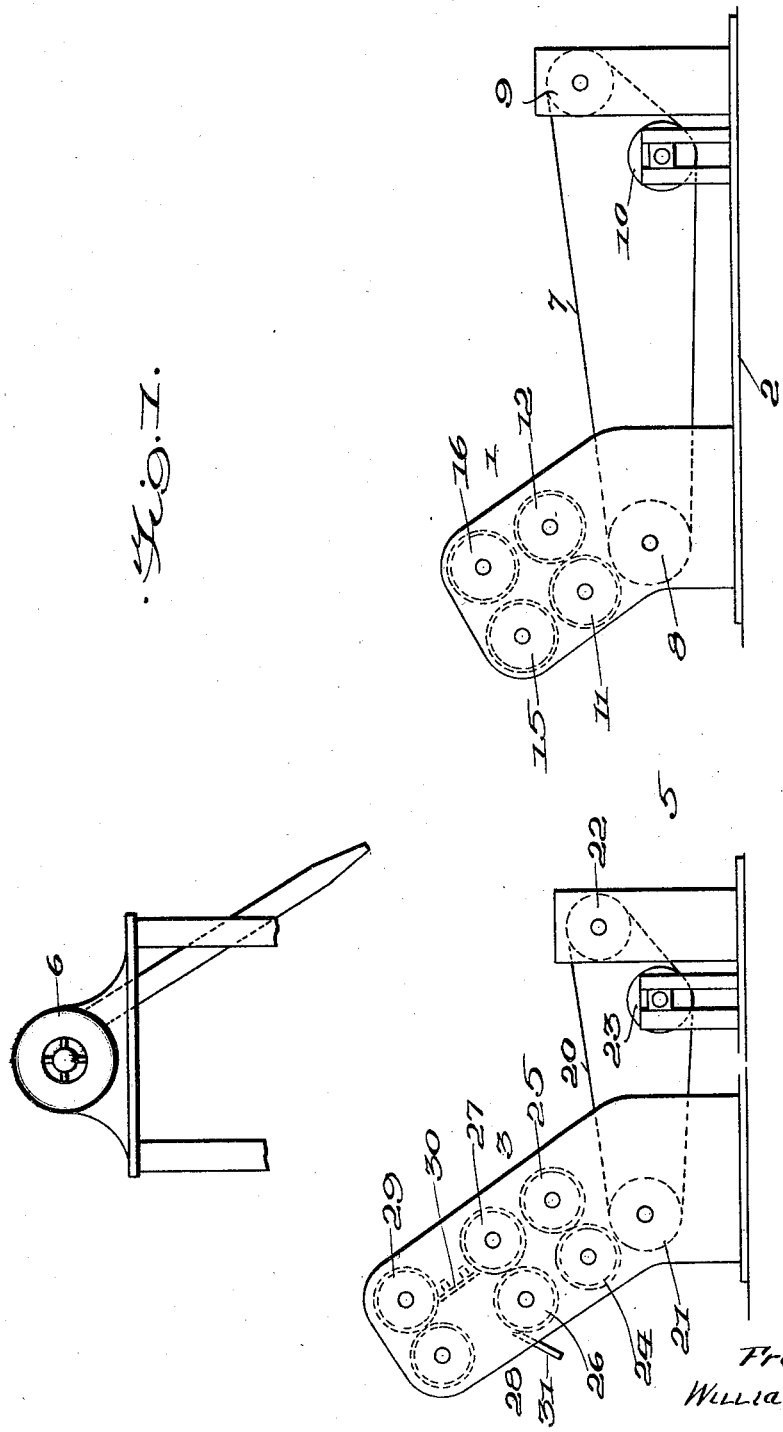
Figure 1 is a longitudinal sectional view of a complete apparatus embodying our invention and adapted to carry out our method.
Figure 2:
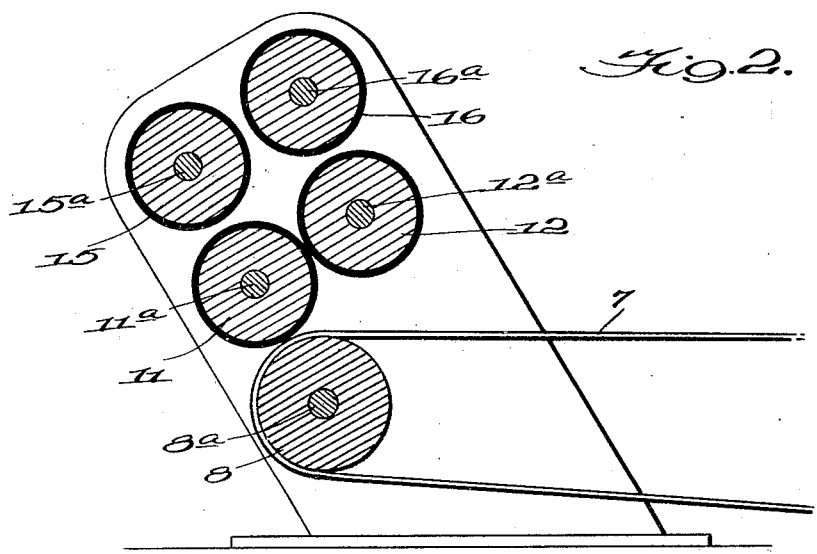
Figure 2 is a longitudinal sectional view on an enlarged scale of the gripping and accelerating unit.

In the drawings 1 indicates the first or gripping and accelerating unit arranged on a base 2, and 3 indicates the second or stalk eliminating unit arranged on a base 4. The bases 2 and 4 may be continuous or separate and base 4 may be lower than base 2. In either case the units 1 and 3 are so separated as to leave between them a substantial space 5 sufficient to permit leaves and portions of the bushes of relatively slight thickness to drop between the two units, but near enough together to permit the beans and the large stalks thrown by the accelerator rollers of the first unit to reach the feed belt of the second unit. An air current may be supplied by a blower 6 directed downward in a direction inclined towards the first unit into space 5 to lessen the length of gap 5 to eliminate the leaves and particles of relatively slight thickness that have not been given high velocity by the accelerator rollers.

Unit 1 comprises a feed belt 7 carried on rollers 8 and 9, one of which, preferably roller 8, is driven. Roller 10 carried on adjustable bearings serves to keep this feed belt tight and running straight so that its upper surface does not sag between rollers 8 and 9 or run to one side. This upper surface of the belt may be inclined downward towards roller 8. Slightly above and forward of roller 8 is arranged a pair of gripping rollers 11 and 12 having peripheral surfaces of yielding material such as rubber. These gripping rollers take the mingled beans, loose leaves and stalks from feed belt 7 and carry them upward between them at a speed substantially the same as that of the feed belt.

The peripheries of the two gripping rollers are in contact, the yielding character of their surfaces permitting beans to pass between them without injury. The peripheral speed of the gripping rollers is preferably about 50 feet per minute, though we do not desire to be limited to any particular speeds.

Above and slightly forward of the gripping rollers is a pair of accelerator rollers 15 and 16. These accelerator rollers have peripheral surfaces of elastic material such as rubber and are so arranged that their peripheries are spaced apart a distance equal to the thickness of the smallest of the beans which are desirable for packing purposes. The yielding surfaces of these accelerating rollers permits beans of greater thickness to pass between them without injury and all beans or stalks which reach these accelerator rollers and are of a thickness greater than the space between them will be sized and have imparted to them a velocity of travel equal to the peripheral speed of the accelerating rollers, while stalks, leaves or other portions of the bushes of less than this thickness only contact with the lower one of the accelerator rollers by gravity alone and their velocity of travel will be only slightly increased over the peripheral speed of rollers 11 and 12. Beans thus accelerated are caused to jump across gap 5 while the slower moving leaves, stalks and other portions of the bushes not of sufficient thickness to be acted on by the accelerator rollers will fall short. The air from blower 6 may be used to check all movement of these slower moving portions of the bushes and cause them to fall close to unit 1.

The shafts of rollers 11, 12, and 15, 16, have their bearings in housings 17 and 18, arranged at an angle of about 45 degrees to the vertical so that the path traversed by the beans and stalks is both forward and upward so as to utilize the force of gravity as well as air resistance to differentiate between fast and slow moving bodies. The housings may, however, be so arranged that the path of movement of the material will be horizontal and air resistance alone made use of.

Unit 3 has feed belt 20 corresponding to feed belt 7 of unit 1 and carried by rollers 21 and 22 of which one, preferably roller 21, is driven, and tightening and aligning roller 23. Feed belt 20 delivers the beans and stalks which drop upon it from the accelerator rollers of unit 1 to feed rollers 24 and 25 by which they are fed to a pair of aligning rollers 26 and 27. The peripheries of the rollers of each pair are in contact and have peripheral surfaces of yielding material such as rubber.

Above and forward of the upper pair of aligning rollers 26 and 27 is a third pair of gripping rollers 28 and 29, separated from rollers 26 and 27 by a substantial space slightly greater than the length of the longer beans. Gripping rollers 24 and 25 are driven at a peripheral speed of about 50 feet per minute while aligning rollers 26 and 27 and gripping rollers 28 and 29 are driven at a peripheral speed of about 100 feet per minute. Rollers 26 and 27, driven at higher speed than rollers 24 and 25, draw stalks gripped by the latter rollers into direct line to bridge the gap between rollers 26 and 28. Stalks thus aligned which are longer than the longer beans will bridge the space between rollers 26 and 27, and rollers 28 and 29 so that their ends will enter between these rollers 28 and 29 to be gripped and carried forward by them. To facilitate this entering of the ends of long stalks between rollers 28 and 29 a shield 30 is arranged above the path of movement of the beans and stalks extending from near roller 27 to near roller 29 slightly above the line of travel of the material moving between rollers 24 and 25, and 26 and 27. A shield 31 may be provided extending from near the upper portion of the periphery of roller 26 downward. Through the space between rollers 26 and 28 the beans, being shorter will drop while longer stalks will reach across and be gripped by rollers 28 and 29, and will so be carried away from the beans which drop between rollers 26 and 28.

Other means than the rollers 24, 25 and 26, 27, such as feed belts may be used for aligning the beans and stalks and causing the longer stalks to bridge the space between such feeding and aligning means, and the gripping rollers 28, 29. No claim is herein made for specific construction of the second unit or for the arrangement in which the second unit, that is the unit by which longer stalks are caused to bridge a space through which the beans drop, precedes the unit by which the beans are given an acceleration or velocity greater than that given to leaves and stalks of less thickness than the beans, as such specific construction and arrangement of units forms the subject matter of a separate application for patent of even date herewith.

Figure 3:
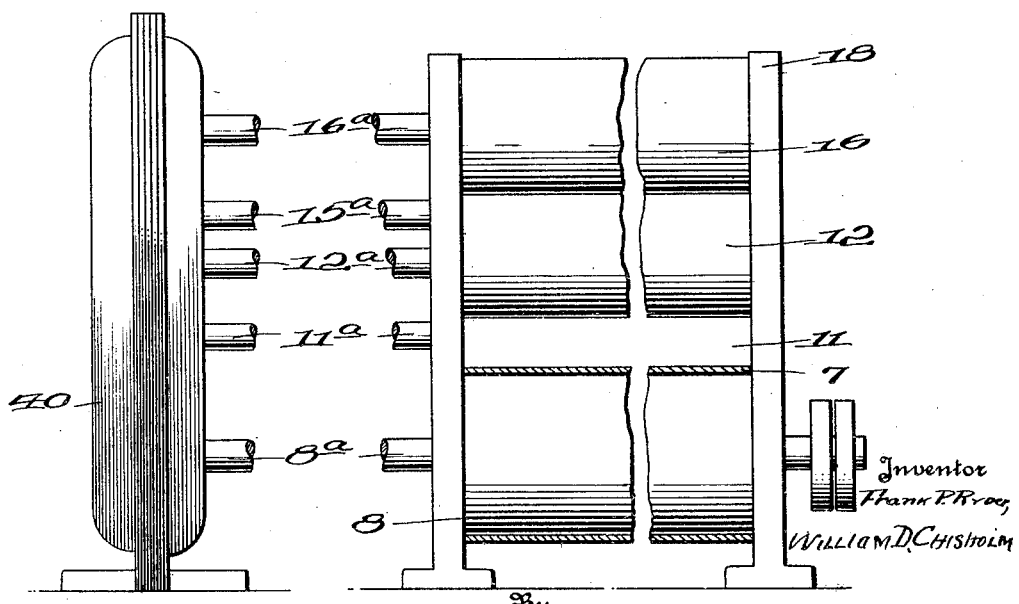
Figure 3 is a front view of the gripping and accelerating unit.

Any driving means adapted to drive the rollers of the accelerating unit at the speeds above indicated and for driving the rollers of the second unit at the speeds indicated may be used. In Figure 3 an arrangement of driving means is indicated. In this arrangement the shafts 11ª, 12ª, of the gripping rollers, and the shafts 15ª, 16ª, of the accelerator rollers are connected at one end, preferably by flexible connections, to the shafts of gears carried in gear box 40 and driven by power shaft 41. The rollers of the second unit are driven by a similar arrangement of gearing.

Having thus described our invention what we claim is:

1. In a method of separating string beans from loose leaves, stalks and other portions of the plants on which they were grown, giving the beans and thicker stalks a velocity of movement greater than that given to leaves and thinner portions of the plants by which they will be caused to fall at a distance from the point at which the thinner portions fall.

2. In a method of separating loose string beans from leaves, stalks and other portions of the plants on which they were grown causing the beans and thicker stalks to be given a velocity of movement greater than that given to leaves and portions stripped from the plants thinner than the beans by which the beans will be caused to fall at a distance from the point at which the smaller portions fall, and subsequently separating the beans from the longer stalks.

3. In a method of separating string beans from loose leaves, stalks and other portions of the plants on which they were grown, causing the beans and thicker stalks to be given a velocity of movement greater than that given to thinner portions stripped from the plants by accelerating means so spaced as to act upon the beans and thicker stalks and not upon thinner portions of the bushes by which the beans and thicker stalks will be caused to fall at a distance from the point at which the leaves and thinner portions fall.

4. The method of separating string beans from portions of the plants on which they were grown, such as loose leaves and stalks, which comprises so imparting movement of translation to the beans and portions of the plants that the beans will be given an acceleration of movement greater than that given to portions of the plants of less thickness as to cause the beans to be impelled further than the portions of less thickness are impelled.

5. The method of separating string beans from portions of the plants on which they were grown such as loose leaves and stalks, which comprises so imparting movement of translation in a direction oblique to a vertical line to the beans and portions of the plants that the beans will be given an acceleration of movement greater than that given to portions of the plant of less thickness as to cause the beans to be impelled further than the portions of less thickness are impelled.

6. The method of separating string beans from portions of the plants on which they were grown, such as loose leaves and stalks, which consists in first eliminating loose leaves and other portions of less thickness than the beans by causing the beans to be given greater velocity of movement than is given to the leaves and thinner portions, and subsequently eliminating stalks longer than the beans.

7. The method of separating string beans from portions of the plants on which they were grown such as loose leaves and stalks which consists in first separating the beans from portions of the plants of less thickness than the beans by so imparting movement of translation to the beans and portions of the stalks that the beans will be given an acceleration of movement greater than that given to the portions of the plants of less thickness as to cause the beans to be impelled further than such portions of the plants of less thickness, and separating the beans subjected to such acceleration from stalks carried with them of greater length than the beans by so imparting movement of translation to the beans and stalks in a straight line inclined from the vertical that the stalks will be caused to bridge an opening of less length than such stalks but of greater length than the beans and continuing the movement of the stalks while permitting the beans to drop.

8. In apparatus for separating string beans from portions of the plants on which they were grown, such as loose leaves and stalks, means giving the beans and portions of the plants movement of translation and accelerator means adapted to grip the beans and thicker stalks without gripping portions of the plants of thickness less than that of the beans and to impart to the beans and stalks gripped by them a velocity of movement greater than that given to the portions of the plants of less thickness.

9. In apparatus for separating string beans from other portions of the plants on which they were grown, such as loose leaves and stalks, means for giving the beans and other portions of the plants movement of translation in a line oblique to a vertical line, accelerating means so spaced as to grip the beans and thicker stalks without gripping portions of the plants of thickness less than that of the beans and to impart to the beans and stalks so gripped by them a velocity of movement greater than that given to the portions of the plants of less thickness.

10. Means for separating string beans from loose leaves and stalks comprising means for imparting movement of translation to the beans, loose leaves and stalks at a predetermined velocity, and accelerating means adapted to so act upon the beans as to give to them an increased velocity greater than that given to the loose leaves and stalks and to impel them further than the leaves and stalks are impelled.

11. Means for separating string beans from portions of the plants on which they were grown such as loose leaves and stalks comprising a pair of feeding rollers having their peripheries in contact or nearly in contact and means for driving them adapted to receive between them the beans and portions of the plants and to impart to them movement at predetermined velocity, and a pair of accelerating rollers having their peripheries so separated as to permit portions of the plants of less thickness than the beans to pass between them without effective contact with more than one roller but so near that the peripheries of both rollers will act upon the beans and means for driving the accelerating rollers at a peripheral speed greater than that of the feeding rollers.

12. In apparatus for separating string beans from portions of the plants on which they were grown, such as loose leaves and stalks, accelerator means adapted to grip the beans and thicker stalks without gripping portions of the plants of thickness less than that of the beans and to impart to the beans and stalks gripped by them a velocity of movement greater than that given to the portions of the plants of less thickness, and means arranged to receive the beans and stalks from said accelerator means and to separate the beans from stalks of greater length than the beans.

13. In apparatus for separating string beans from portions of the plants on which they were grown, such as loose leaves and stalks, means for imparting movement of translation to the beans and portions of the plants and a pair of accelerator rollers arranged to receive the beans and other portions of the plants from the movement impelling means so spaced apart as to permit relatively thin stalks, leaves and other relatively thin portions of the plants to pass between them, but so close together that the peripheries of both rollers will act upon the beans and stalks similar in thickness to the beans, said accelerator rollers being driven at such speed as to give to the beans and such stalks an impetus sufficient to impel them to a substantial distance.

14. In apparatus for separating string beans from portions of the plants on which they were grown such as loose leaves and stalks, a pair of gripping rollers adapted to receive the beans and portions of the plants between them and to impart to them movement of translation in a line oblique to a vertical line, means for driving the gripping rollers at a predetermined peripheral speed, and a pair of accelerator rollers arranged to receive the beans and portions of the plants from the gripping rollers and driven at a peripheral speed greater than that of the gripping rollers, said accelerator rollers being so spaced apart that their peripheries will grip the beans without gripping the leaves and portions of the plants of less thickness than the beans.

15. In apparatus for separating string beans from portions of the plants on which they were grown, such as loose leaves and stalks, a pair of gripping rollers adapted to receive the beans and portions of the plants and to feed them to a pair of accelerator rollers in position to receive the beans from the gripping rollers, driven at higher speed than the gripping rollers and so spaced apart that only beans and thicker stalks will contact with the peripheries of both rollers of the pair.

In testimony whereof, we hereunto affix our signatures.

FRANK PITTIS RYDER.
WILLIAM DONALD CHISHOLM.